United States Patent
Drukman et al.

(10) Patent No.: US 9,053,234 B2
(45) Date of Patent: Jun. 9, 2015

(54) COLLAPSIBLE STACK TRACE

(75) Inventors: Maxwell O. Drukman, San Francisco, CA (US); Andreas W. Wendker, Mountain View, CA (US); Stephen R. Lewallen, San Jose, CA (US); David V. Payne, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 527 days.

(21) Appl. No.: 13/089,132

(22) Filed: Apr. 18, 2011

(65) Prior Publication Data

US 2011/0258604 A1 Oct. 20, 2011

Related U.S. Application Data

(60) Provisional application No. 61/325,703, filed on Apr. 19, 2010.

(51) Int. Cl.
*G06F 9/44* (2006.01)
*G06F 11/36* (2006.01)

(52) U.S. Cl.
CPC .......... *G06F 11/3664* (2013.01); *G06F 11/366* (2013.01); *G06F 11/3636* (2013.01)

(58) Field of Classification Search
None
See application file for complete search history.

(56) References Cited

U.S. PATENT DOCUMENTS

| | | | |
|---|---|---|---|
| 7,526,754 B2* | 4/2009 | Bentolila | 717/124 |
| 7,716,647 B2* | 5/2010 | Loh et al. | 717/127 |
| 7,797,643 B1 | 9/2010 | Jobs et al. | |
| 2003/0088854 A1* | 5/2003 | Wygodny et al. | 717/130 |
| 2005/0183068 A1* | 8/2005 | Cwalina et al. | 717/128 |
| 2006/0092846 A1* | 5/2006 | Loh et al. | 370/241 |
| 2006/0129993 A1* | 6/2006 | Belisario et al. | 717/124 |
| 2006/0195823 A1* | 8/2006 | Bentolila | 717/127 |
| 2006/0253837 A1* | 11/2006 | Hudson et al. | 717/124 |
| 2008/0052678 A1* | 2/2008 | Chagoly et al. | 717/124 |
| 2009/0100413 A1* | 4/2009 | Nash | 717/124 |
| 2010/0088546 A1* | 4/2010 | Chilimbi et al. | 714/26 |
| 2010/0125834 A1* | 5/2010 | Matic | 717/125 |
| 2010/0235815 A1* | 9/2010 | Maybee et al. | 717/125 |
| 2011/0072418 A1* | 3/2011 | Kalamegham et al. | 717/128 |
| 2011/0138363 A1* | 6/2011 | Schmelter et al. | 717/128 |

OTHER PUBLICATIONS

Arasteh et al., "Forensic Memory Analysis: From stack and code to execution history", 2007, Elsevier Ltd., Digital linvestigations 4S (2007), pp. S114-S125.*
Anderson, "Xcode 3 Unleashed," Aug. 2008, pp. 1-534.*

(Continued)

*Primary Examiner* — Thuy Dao
*Assistant Examiner* — Stephen Berman
(74) *Attorney, Agent, or Firm* — Downey Brand LLP

(57) ABSTRACT

A tool for analyzing software is enhanced to provide multiple views of a stack trace, with each view having a different level of detail. Different views may be lightly simplified, moderately simplified, or heavily simplified. The display of a complete stack trace includes entries for all stack frames in the stack trace. The display of a simplified stack trace includes entries for fewer than all stack frames in the stack trace, thereby "hiding" or "collapsing" entries for some of the stack frames, relative to the complete stack trace display. After a user specifies a level of complexity with which to show a stack trace, the enhanced analysis tool GUI updates the stack trace display according to the specified level. A complexity level is associated with a set of heuristics that is used to create a view of a stack trace at that complexity level.

20 Claims, 15 Drawing Sheets
(13 of 15 Drawing Sheet(s) Filed in Color)

(56) References Cited

OTHER PUBLICATIONS

Sinha et al., "Fault localization and repair for Java runtime exceptions," 2009, Proceeding ISSTA '09 Proceedings of the eighteenth international symposium on Software testing and analysis, pp. 153-164.*

Bond et al., "Tracking bad apples: reporting the origin of null and undefined value errors," 2007, Proceedings of the 22nd annual ACM SIGPLAN conference on Object-oriented programming systems and applications, pp. 405-422.*

Ahn et al., "Scalable temporal order analysis for large scale debugging," 2009, Proceedings of the Conference on High Performance Computing Networking, Storage and Analysis Article No. 44, pp. 1-11.*

Apple Inc., "Instruments User Guide," May 7, 2011, pp. 1-6 and 51-53, [online] [retrieved on Aug. 15, 2011] Retrieved from the internet <URL: http://developer.apple.com/library/mac/documentation/DeveloperTools/Conceptual/InstrumentsUserGuide/InstrumentsUserGuide.pdf>.

IBM, "Dynamic Stack Trace Displaying for Viewing Application Exception Output," Jan. 21, 2005, 2 pages, [online] [retrieved from IP.com, Inc.] [retrieved on Aug. 15, 2011] Retrieved from the internet <URL: http://ip.com/IPCOM/000035504>.

LLNL, "Stack Trace Analysis Tool (STAT)," Last Modified May 13, 2011, 6 pages, [online] [retrieved on Aug. 15, 2011] Retrieved from the internet <URL: https://computing.llnl.gov/code/STAT/>.

Microsoft, "Call Stack Window," Visual Studio .Net 2003, 2011, 1 page, [online] [retrieved on Aug. 15, 2011] Retrieved from the internet <URL: http://msdn.microsoft.com/en-us/library/aa290725.aspx>.

Microsoft, "Call Stack Window," Windows CE 5.0, 2011, 3 pages, [online] [retrieved on Aug. 15, 2011] Retrieved from the internet <URL: http://msdn.microsoft.com/en-us/library/ms934288.aspx>.

Microsoft, "How to: Use the Call Stack Window," Visual Studio 2010, 2011, 4 pages, [online] [retrieved on Aug. 15, 2011] Retrieved from the internet <URL: http://msdn.microsoft.com/en-us/library/a3694ts5.aspx>.

Microsoft, "How to: View a Stack Trace and Navigate to Point of Failure," 2011, 3 pages, [online] [retrieved on Aug. 15, 2011] Retrieved from the internet <URL: http://msdn.microsoft.com/en-us/library/bb514156.aspx>.

Microsoft, "Using the Call Stack Window," Visual Studio .NET 2003, 2011, 2 pages, [online] [retrieved on Aug. 15, 2011] Retrieved from the internet <URL: http://msdn.microsoft.com/en-us/library/a3694ts5(v=vs.71).aspx>.

\* cited by examiner

FIG. 1

| Category Icon | Library Type |
|---|---|
|  | Audio, Speech |
|  | Cocoa (API) |
|  | Database |
|  | Frameworks |
|  | Graphics |
|  | Languages |
|  | User (debug info. and/or source files available) |
|  | Network I/O |
|  | Security |
|  | System |
|  | Web |

COLLAPSIBLE STACK TRACE

CROSS-REFERENCE TO RELATED APPLICATION

This application claims the benefit of U.S. Provisional Application No. 61/325,703, filed Apr. 19, 2010, which is hereby incorporated by reference herein in its entirety.

BACKGROUND

1. Field of Art

This application generally relates to a tool for analyzing software. More particularly, it relates to displaying stack trace information.

2. Description of the Related Art

Each time a software application performs a function call, information about the call is generated. That information generally includes the location of the call in the application, the arguments of the call, and the local variables of the function being called. The information is stored in a block of data called a stack frame. Stack frames are allocated in a region of memory called the call stack. The call stack is divided into contiguous pieces called stack frames or, simply, frames. Each frame includes the data associated with one call to one function. The frame contains the arguments given to the function, the function's local variables, and the address at which the function is executing. The concept of the stack frame is well known to those of skill in the art.

When an application is started, the stack includes an initial frame associated with the main function call of the application—typically named "main." Each time a function is called, a new frame is created. Each time a function returns, the frame for that function invocation is removed. The frame being executed at a particular time is called the innermost frame. This is the most recently created of all the stack frames that still exist.

A stack trace (sometimes referred to as a "backtrace") is a summary of how an application reached a particular state in terms of various functions being called. A stack trace generally shows one line of text per stack frame, starting with the currently executing frame (frame N), followed by frame N's caller (frame N−1), and so on up the stack.

The execution of a complex software application can generate a stack trace that contains tens or even hundreds of stack frames.

SUMMARY

A stack frame contains data associated with one call to one function. A stack trace is a summary of how an application reached a particular state in terms of various functions being called. A stack trace generally shows one line of text per stack frame, starting with the currently executing frame, followed by that frame's caller, and so on up the stack.

A tool for analyzing software is enhanced to provide multiple views of a stack trace, with each view having a different level of detail. Different views may be lightly simplified, moderately simplified, or heavily simplified.

In one embodiment, a graphical user interface (GUI) for the enhanced analysis tool displays information regarding a particular stack frame as an "entry" that includes text and/or graphics. The display of a complete stack trace includes entries for all stack frames in the stack trace. The display of a simplified stack trace includes entries for fewer than all stack frames in the stack trace. In other words, the simplified stack trace display "hides" or "collapses" entries for some of the stack frames, relative to the complete stack trace display.

In one embodiment, the enhanced analysis tool enables a user to specify a level of complexity with which to show a stack trace. After the user specifies the complexity level, the enhanced analysis tool GUI updates the stack trace display according to the specified level. The complexity level can be specified using any type of GUI control element, such as a button or a text field. In one embodiment, as the user progresses through each complexity value (e.g., by dragging a slider thumb or by turning a dial), the enhanced analysis tool GUI updates the view of the stack trace display according to the currently-specified complexity level.

A defined complexity level is associated with a set of heuristics that is used to create a view of a stack trace at that complexity level. In one embodiment, the stack trace view for a particular complexity level is created by applying heuristics for the previous complexity level(s) in addition to applying heuristics for that particular complexity level. Examples of heuristics include: Hide entries for frames between entry and exit for each library not in a particular category. Hide entries for frames between entry and exit for any library not in a particular category (including across boundaries that divide one library from another library). Hide entries for frames for all libraries, except those libraries that have debug information.

If an application is multi-threaded, then each thread has its own associated stack trace. In one embodiment, the enhanced analysis tool GUI shows two or more of these stack traces simultaneously (e.g., with each stack trace enclosed in a separate box or frame). The simultaneously-displayed stack traces could be displayed with either identical complexity levels or different complexity levels.

BRIEF DESCRIPTION OF DRAWINGS

The patent or application file contains at least one drawing executed in color. Copies of this patent or patent application publication with color drawings will be provided by the U.S. Patent and Trademark Office upon request and payment of the necessary fee.

FIG. 1 illustrates a graphical user interface (GUI) for an analysis tool that includes a complete stack trace, according to one embodiment of the invention.

FIG. 8 illustrates a GUI for an analysis tool that includes a complete stack trace for a multi-threaded application, according to one embodiment of the invention.

FIG. 9 illustrates a GUI for an analysis tool that includes a lightly simplified view of the stack trace illustrated in FIG. 8 for a multi-threaded application, according to one embodiment of the invention.

FIG. 10 illustrates a GUI for an analysis tool that includes a moderately simplified view of the stack trace illustrated in FIG. 8 for a multi-threaded application, according to one embodiment of the invention.

FIG. 12 illustrates a GUI for an analysis tool that includes a complete stack trace, according to another embodiment of the invention.

FIG. 13 illustrates a GUI for an analysis tool that includes a lightly simplified view of the stack trace illustrated in FIG. 12, according to another embodiment of the invention.

DETAILED DESCRIPTION

Figure 2:
FIG. 2 is a table of category icons and the types of libraries that they represent, according to one embodiment of the invention.
Figure 2:
Figure 2:
Figure 2:
Figure 2:
Figure 2:
Figure 2:
Figure 2:
Figure 2:
Figure 2:
Figure 2:

The features and advantages described in the specification are not all inclusive and, in particular, many additional features and advantages will be apparent to one of ordinary skill in the art in view of the drawings, specification, and claims. The language used in the specification has been principally selected for readability and instructional purposes, and may not have been selected to delineate or circumscribe the disclosed subject matter.

The figures and the following description relate to embodiments of the invention by way of illustration only. Alternative embodiments of the structures and methods disclosed here may be employed without departing from the principles of what is claimed.

Reference will now be made in detail to several embodiments, examples of which are illustrated in the accompanying figures. Wherever practicable similar or like reference numbers may be used in the figures and may indicate similar or like functionality. The figures depict embodiments of the disclosed systems (or methods) for purposes of illustration only. One skilled in the art will readily recognize from the following description that alternative embodiments of the structures and methods illustrated herein may be employed without departing from the principles described herein.

An analysis tool analyzes the behavior of one or more software application processes executed by one or more processors. Examples of analysis tools include debuggers and performance tools. Examples of debuggers include the Xcode Debugger from Apple Inc. and the Visual Studio Debugger from Microsoft Corp. Other debuggers are known to those of skill in the art. An example of a performance tool is Instruments from Apple Inc. Other performance tools are known to those of skill in the art.

Many analysis tools are able to display stack traces. As described above, the execution of a complex software application can generate a stack trace that contains tens or hundreds of stack frames. It can be tedious and time-consuming for a user (e.g., a software developer or system administrator) to navigate such a large, complex stack trace and to use the stack trace to help analyze the application.

In one embodiment, an analysis tool is enhanced to provide multiple views of a stack trace, with each view having a different level of detail. Different views may be lightly simplified, moderately simplified, or heavily simplified. Other embodiments can include more or fewer levels of simplification. FIGS. 1, 3, 4, and 5 illustrate graphical user interfaces (GUIs) of one embodiment of an enhanced analysis tool.

Figure 1:
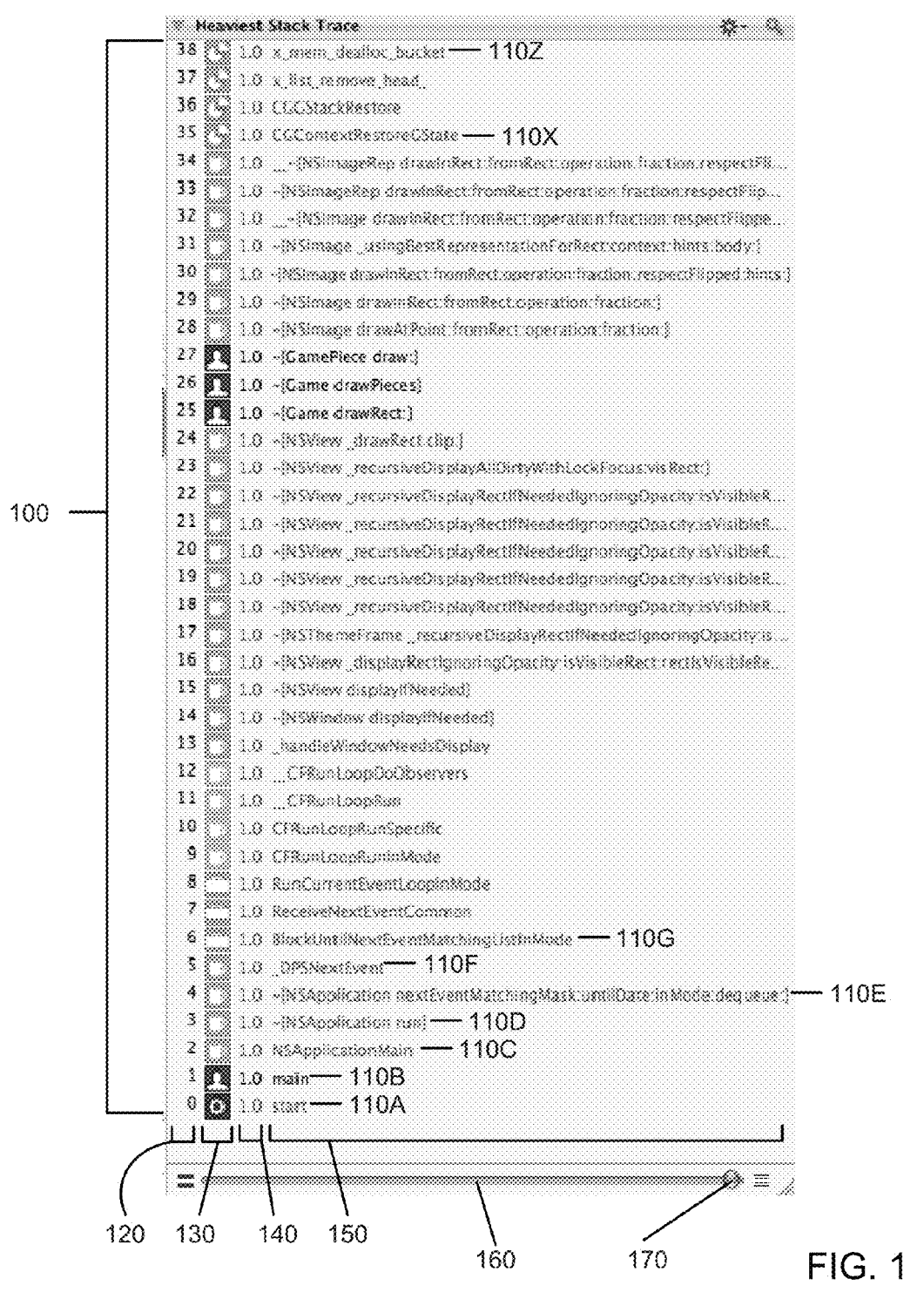

FIG. 1 illustrates a graphical user interface (GUI) for an analysis tool that includes a complete stack trace 100, according to one embodiment of the invention. In FIG. 1, the complete stack trace 100 includes 39 entries 110, each of which represents one stack frame. In the illustrated embodiment, each entry 110 includes four pieces of information about a particular stack frame: a stack frame number 120, a category icon 130, a weight 140, and a function name 150. Other embodiments can include more or fewer pieces of frame information and/or different pieces of frame information.

In FIG. 1, various entries 110 are labeled, including entries 110A, 110B, 110C, 110D, 110E, 110F, 110G, 110X, and 110Z. Entry 110A includes a stack frame number 120 that is "0" (120A), a category icon 130 that is a gear (130A), a weight 140 that is "1.0" (140A), and a function name 150 that is "start" (150A). Entry 110B includes a stack frame number 120 that is "1", a category icon 130 that is a person, a weight 140 that is "1.0", and a function name 150 that is "main". Entry 110C includes a stack frame number 120 that is "2", a category icon 130 that is a coffee mug, a weight 140 that is "1.0", and a function name 150 that is "NSApplicationMain". Entry 110D includes a stack frame number 120 that is "3", a category icon 130 that is a coffee mug, a weight 140 that is "1.0", and a function name 150 that is "-[NSApplication run]".

Stack frame numbers 120 are assigned by the analysis tool and provide a way to refer to a particular stack frame (e.g., within a debugging command). In a particular stack trace, each stack frame is assigned a different stack frame number 120. In FIG. 1, the stack frame numbers 120 for the various entries 110 range from 0 to 38, where 0 refers to the outermost frame (represented by entry 110A in FIG. 1), and 38 refers to the innermost frame (represented by entry 110Z in FIG. 1).

In various embodiments, category icons 130 represent different types of libraries associated with a stack frame's function name 150. For example, in the illustrated embodiment a category icon of a gear (e.g., 130A) represents a System library, a category icon of a person (e.g., 130B) represents a library that has debug information and/or source files available (such as a user file), and a category icon of a coffee mug (e.g., 130C) represents a Cocoa (API) library. Categorizing stack frames in this way provides a level of abstraction that helps a user (e.g., a software developer or system administrator) more easily understand a stack trace and identify frames that concern similar functions. Of course, the particular icon chosen for each category may be anything deemed appropriate by the implementer.

In one embodiment, category icons 130 of different types (e.g., a gear icon versus a person icon) are different colors. For example, a gear icon is black, while a coffee mug icon is light purple. In one embodiment, category icons that are adjacent to each other but concern different libraries are different colors. For example, in FIG. 1, the entries 110 associated with stack frame numbers 12 and 13 have coffee mug category icons 130. However, the entry associated with stack frame number 12 has a light brown coffee mug icon, and the entry associated with stack frame number 13 has a light purple coffee mug icon. Coloring category icons 130 in this way provides a level of abstraction that helps a user more easily understand a stack trace and identify frames that concern the same library versus a different library (but within the same category).

In FIG. 1, the various entries 110 show a total five different category icons 130. In addition to the gear icon 130A, person icon 130B, and coffee mug icon 130C described above, FIG. 1 also shows a briefcase icon 130G (which represents a Framework library) and a pie chart icon 130X (which represents a Graphics library). FIG. 2 is a table of category icons 130 and the types of libraries that they represent, according to one embodiment of the invention. Other embodiments can include more or fewer category icons 130 and/or different category icons 130.

A weight 140 is the amount of execution time spent in a stack frame in different paths through a call tree. When a particular node in a call tree is selected, the corresponding stack trace is the deepest (i.e., includes the largest number of frames) at that particular node. The weights 140 can differ for different frames. For example, more time is generally spent in outermost frames. This is because the outermost frames spend additional time going through code paths other than the code path that includes the selected node. So, weights for outermost frames are generally larger than weights for innermost frames.

Recall that a stack frame contains data associated with one call to one function. A stack frame's function name 150 represents the function that was called, thereby creating that stack frame.

Figure 3:
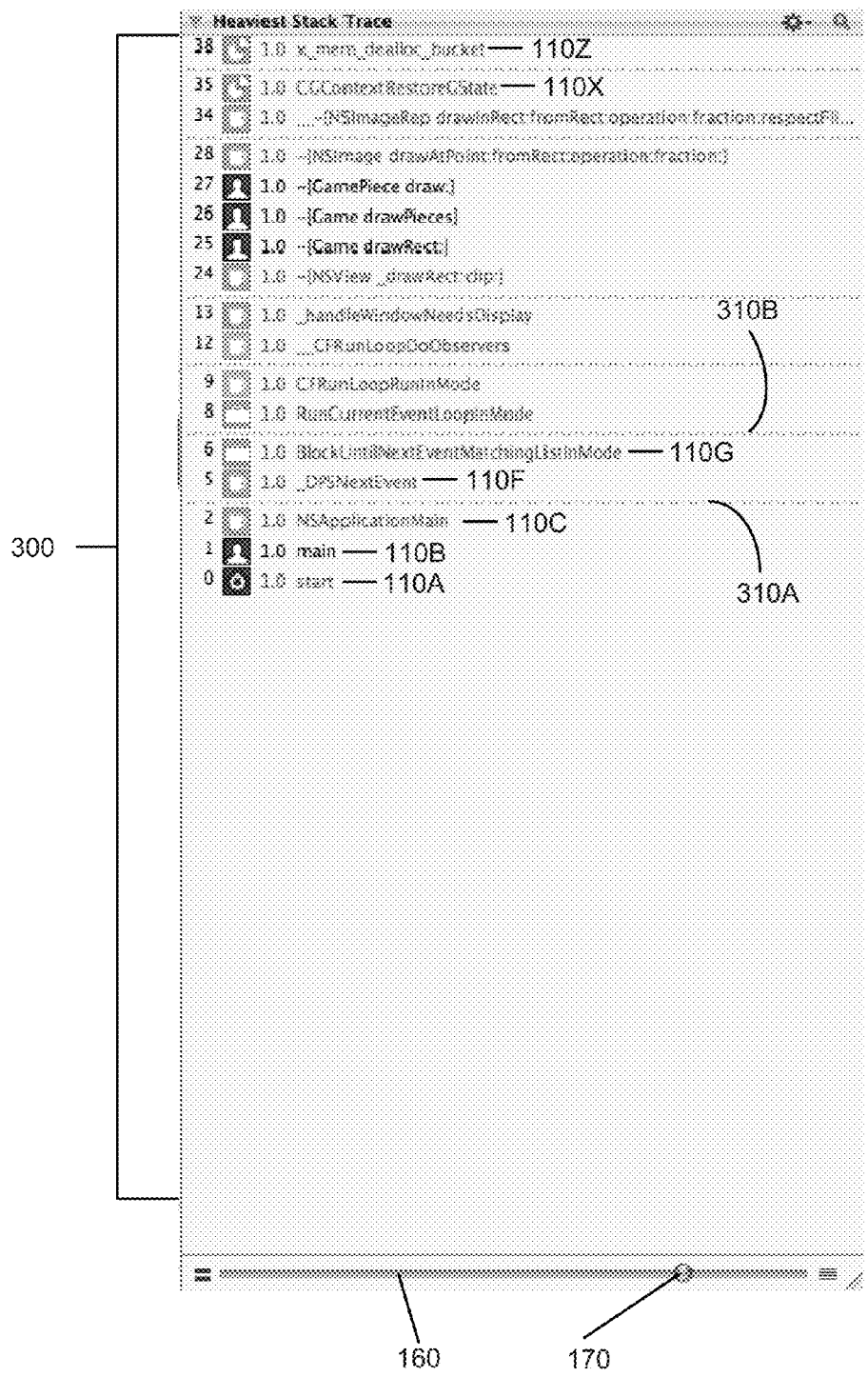
FIG. 3 illustrates a GUI for an analysis tool that includes a lightly simplified view of the stack trace illustrated in FIG. 1, according to one embodiment of the invention.

In FIG. 1, the analysis tool GUI displays one entry 110 for each stack frame. In other words, a complete stack trace 100 is shown. FIG. 3 illustrates a GUI for an analysis tool that includes a lightly simplified view of the stack trace illustrated in FIG. 1, according to one embodiment of the invention. Specifically, the GUI in FIG. 3 is describing the same stack trace as in FIG. 1 but in lightly simplified form.

Note that whereas the complete stack trace 100 in FIG. 1 contains 39 entries 110, the lightly simplified view of the stack trace 300 in FIG. 3 contains only 17 entries 110. The 17 entries 110 in FIG. 3 are identical to 17 of the 39 entries 110 in FIG. 1. The remaining 22 entries 110 of FIG. 1 do not appear in FIG. 3.

Instead of showing these entries, FIG. 3 shows one or more dotted lines 310. Each dotted line 310 represents one or more entries 110 of the stack trace that are not present in the current view. For example, starting from the bottom of the stack trace 300, FIG. 3 shows entries 110 with stack frame numbers of 0, 1, 2, and 5. Between entry 110C (stack frame number 2) and entry 110F (stack frame number 5), there is a dotted line 310A. The dotted line 310A represents the hiding (or "collapse") of 2 entries: 110D (stack frame number 3) and 110E (stack frame number 4). The dotted line 310B represents the hiding of 1 entry (stack frame number 7).

Figure 4:
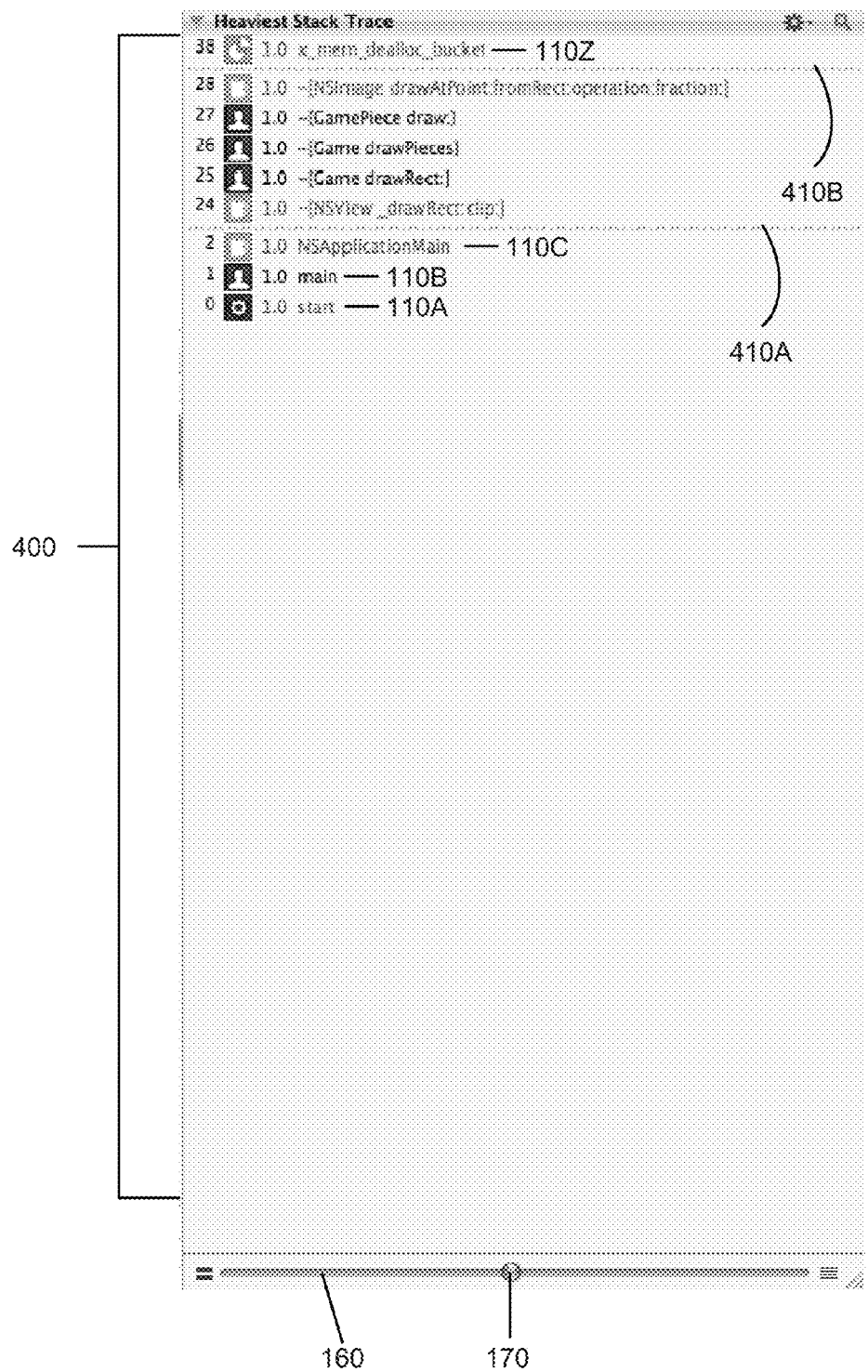
FIG. 4 illustrates a GUI for an analysis tool that includes a moderately simplified view of the stack trace illustrated in FIG. 1, according to one embodiment of the invention.

FIG. 4 illustrates a GUI for an analysis tool that includes a moderately simplified view of the stack trace illustrated in FIG. 1, according to one embodiment of the invention. Specifically, the GUI in FIG. 4 is describing the same stack trace as in FIG. 1 (and FIG. 3) but in moderately simplified form. Note that whereas the complete stack trace 100 in FIG. 1 contains 39 entries 110 (and the lightly simplified view of the stack trace 300 in FIG. 3 contains 17 entries 110), the moderately simplified view of the stack trace 400 in FIG. 4 contains only 9 entries 110. The 9 entries 110 in FIG. 4 are identical to 9 of the 39 entries 110 in FIG. 1 (and 9 of the 17 entries 110 in FIG. 3). The remaining 30 entries 110 of FIG. 1 (and 8 entries of FIG. 3) do not appear in FIG. 4.

Instead of showing these entries, FIG. 4 shows one or more dotted lines 410. Each dotted line 410 represents one or more entries 110 that have been hidden. For example, starting from the bottom of the stack trace 400, FIG. 4 shows entries 110 with stack frame numbers of 0, 1, 2, and 24. Between entry 110C (stack frame number 2) and the entry with stack frame number 24, there is a dotted line 410A. The dotted line 410A represents the hiding of 21 entries: stack frame number 3 through stack frame number 23. The dotted line 410B represents the hiding of 9 entries: stack frame number 29 through stack frame number 37.

Figure 5:
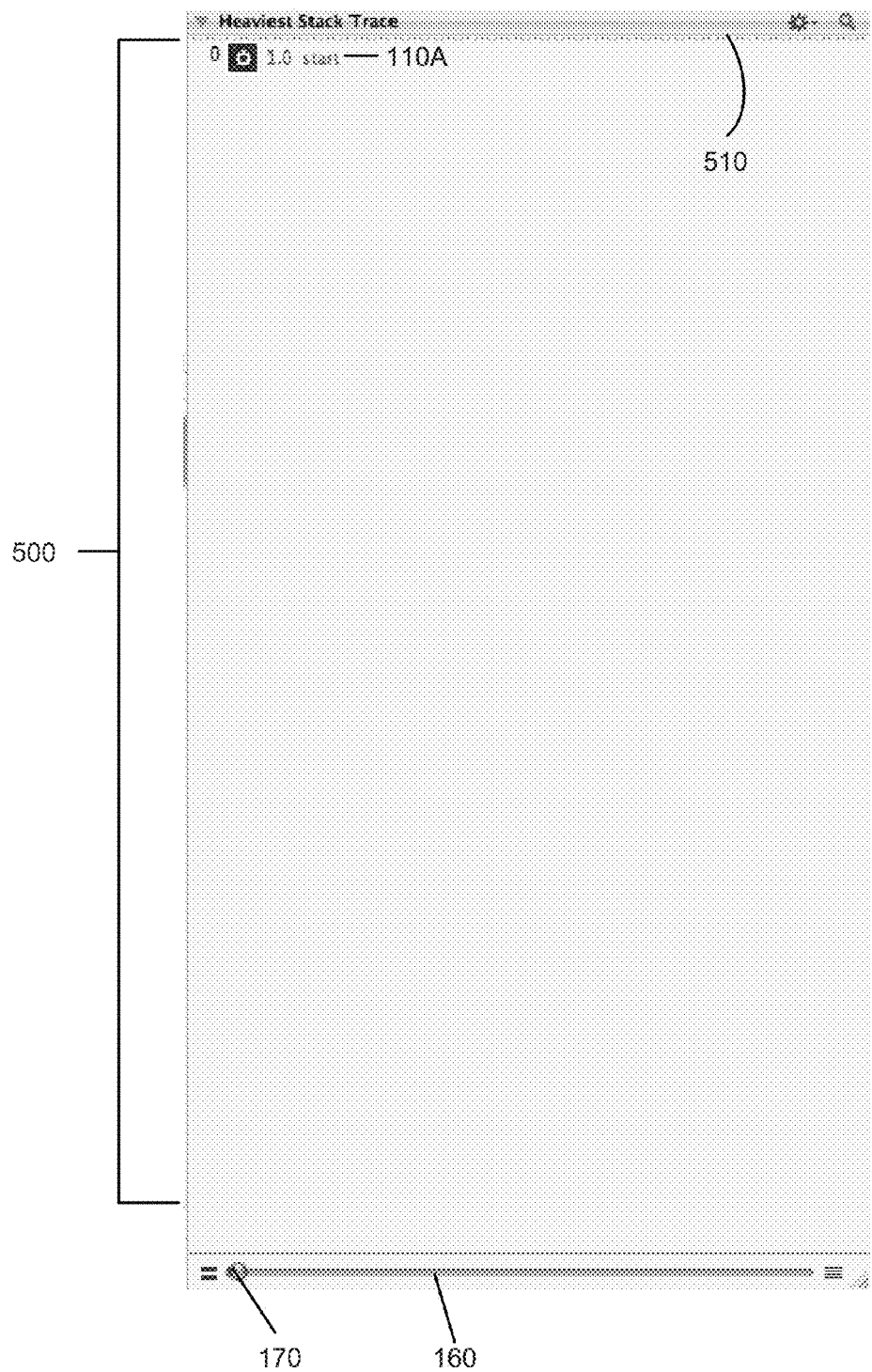
FIG. 5 illustrates a GUI for an analysis tool that includes a heavily simplified view of the stack trace illustrated in FIG. 1, according to one embodiment of the invention.

FIG. 5 illustrates a GUI for an analysis tool that includes a heavily simplified view of the stack trace illustrated in FIG. 1, according to one embodiment of the invention. Specifically, the GUI in FIG. 5 is describing the same stack trace as in FIG. 1 (and FIGS. 3 and 4) but in heavily simplified form. Note that whereas the complete stack trace 100 in FIG. 1 contains 39 entries 110, the heavily simplified stack trace 500 in FIG. 5 contains only one entry 110. The one entry 110 in FIG. 5 (110A) is identical to one of the 39 entries 110 in FIG. 1 (110A). The remaining 38 entries 110 of FIG. 1 do not appear in FIG. 5. Instead of showing these entries, FIG. 5 shows a dotted line 510 that represents the hiding of the remaining 38 entries: stack frame number 1 through stack frame number 38.

FIGS. 1, 3, 4, and 5 illustrate analysis tool GUIs that show the same stack trace according to different levels of complexity. In one embodiment, an analysis tool is enhanced so that a user (e.g., a software developer or system administrator) can specify a level of complexity with which to show a stack trace. After the user specifies the complexity level, the analysis tool GUI updates the stack trace display according to the specified level. The complexity level can be specified using any type of GUI control element, such as a button or a text field.

In one embodiment, the complexity level is specified using a control element that enables a user to specify any one value within a range or spectrum of possible values using only one gesture. For example, the control element can be a slider with a "thumb" that can be dragged from side to side and placed at either end of the slider or somewhere in the middle. As another example, the control element can be a dial that can be turned clockwise or counterclockwise in order to move a position indicator that can be placed in one of two extreme positions or somewhere in the middle.

In one embodiment, as the user progresses through each complexity value (e.g., by dragging a slider thumb or by turning a dial), the analysis tool GUI updates the view of the stack trace display according to the currently-specified complexity level. In this way, the user is provided with feedback regarding which control element setting (e.g., which slider thumb position or which dial position) corresponds to which stack trace display and, as a result, can more easily choose a stack trace display that is appropriate to the situation. In one embodiment, explanatory information regarding complexity level is displayed to the user when the user is manipulating a complexity control element (e.g., a complexity slider or dial) or when the user is about to manipulate a complexity control element (e.g., when a cursor is hovering on or near the control element).

Returning to FIG. 1, the illustrated analysis tool GUI also includes a slider 160 and a thumb 170 that is placed along the slider. In one embodiment, the slider 160 represents a range or spectrum of possible complexity values and is referred to as a complexity slider. The position of the thumb 170 relative to the slider 160 specifies a particular complexity value. The specified complexity value corresponds to the complexity value with which the stack trace 100 is currently being displayed.

In FIG. 1, the thumb 170 is located at the far right of the slider 160, which corresponds in the displayed embodiment to maximum complexity. As a result, the stack trace 100 is displayed in full (i.e., without simplification). In FIG. 3, the thumb 170 is located between the middle of the slider 160 and the far right of the slider 160, which corresponds to somewhat less complexity. As a result, the stack trace 300 is displayed with light simplification. In FIG. 4, the thumb 170 is located in the middle of the slider 160, which corresponds to moderately less complexity. As a result, the stack trace 400 is displayed with moderate simplification. In FIG. 5, the thumb 170 is located at the far left of the slider 160, which corresponds to significantly less complexity. As a result, the stack trace 500 is displayed with heavy simplification.

In one embodiment, when the analysis tool GUI first displays a stack trace, the stack trace is displayed with a default level of complexity (e.g., simplified form). The user can then change the complexity level if desired. For example, the user can move the thumb 170 to the left to decrease the complexity or to the right to increase the complexity. In one embodiment, the default level of complexity is configurable by the user (e.g., a software developer or system administrator).

Recall that a stack trace is a summary of how an application reached a particular state in terms of various functions being called. If the application is multi-threaded, then each thread will have its own associated stack trace. An analysis tool GUI might show two or more of these stack traces simultaneously (e.g., with each stack trace enclosed in a separate box or frame). In one embodiment, all of the simultaneously-displayed stack traces are displayed with the same complexity level. For example, all of the simultaneously-displayed stack traces are shown without simplification (i.e., in full) or all of the simultaneously-displayed stack traces are shown with light simplification. In this embodiment, the user specifies only one complexity value (e.g., by using one slider 160 and one thumb 170), which is then applied to all of the simultaneously-displayed stack traces.

Figure 9:
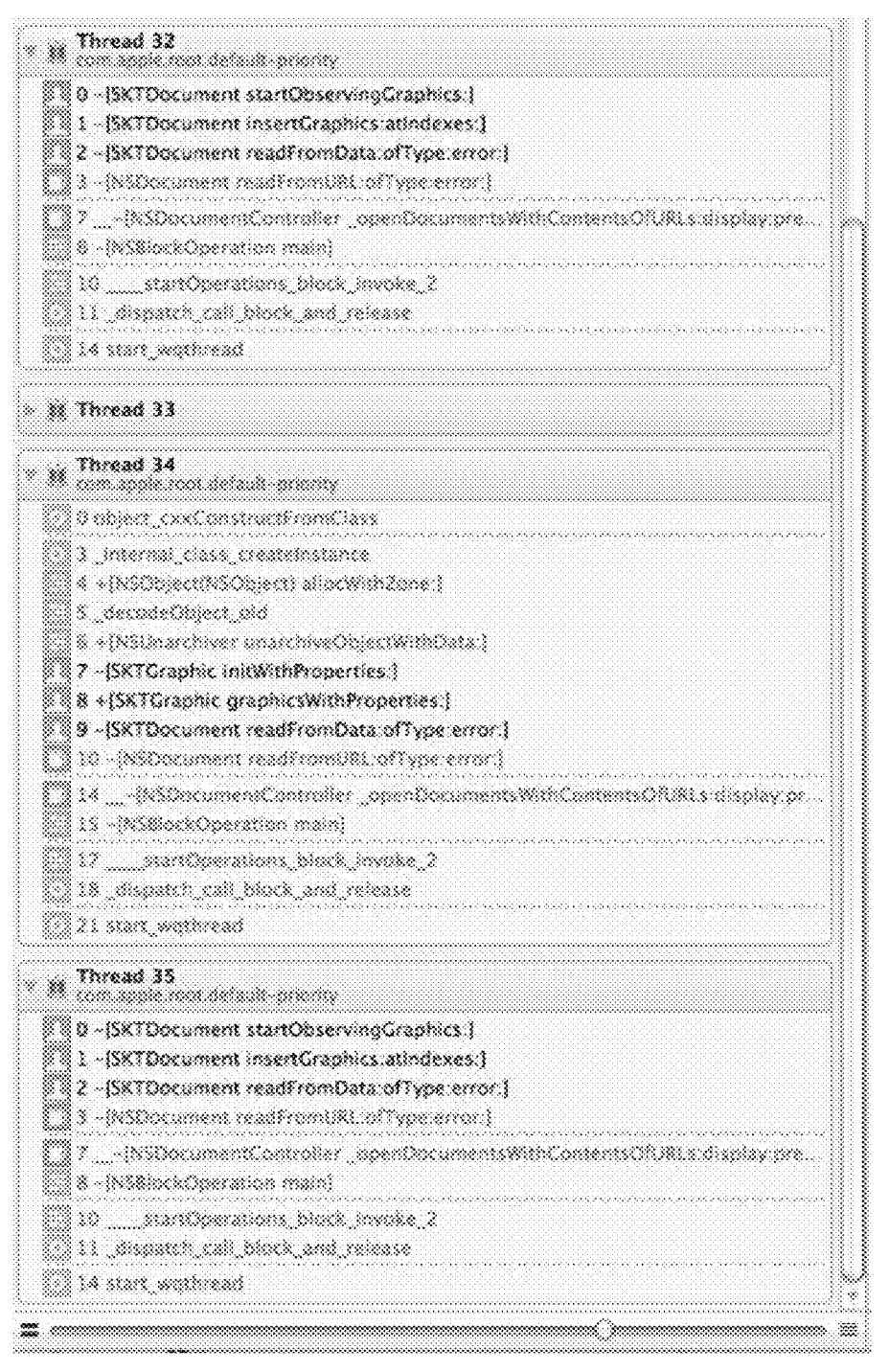
Figure 11:
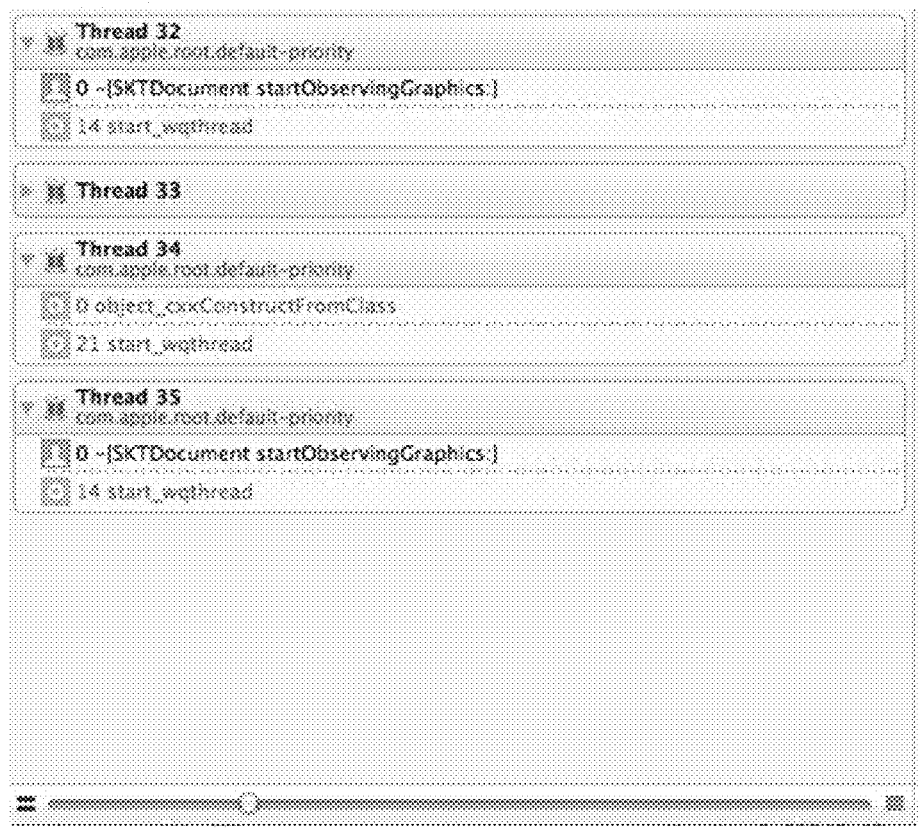
FIG. 11 illustrates a GUI for an analysis tool that includes a heavily simplified view of the stack trace illustrated in FIG. 8 for a multi-threaded application, according to one embodiment of the invention.

FIG. 8 illustrates a GUI for an analysis tool that includes a complete stack trace for a multi-threaded application, according to one embodiment of the invention. FIG. 9 illustrates a GUI for an analysis tool that includes a lightly simplified view of the stack trace illustrated in FIG. 8 for a multi-threaded application, according to one embodiment of the invention. FIG. 10 illustrates a GUI for an analysis tool that includes a moderately simplified view of the stack trace illustrated in FIG. 8 for a multi-threaded application, according to one embodiment of the invention. FIG. 11 illustrates a GUI for an analysis tool that includes a heavily simplified view of the stack trace illustrated in FIG. 8 for a multi-threaded application, according to one embodiment of the invention.

In an alternative embodiment, each stack trace for a multi-threaded application can be associated with a different complexity level. In this embodiment, the user specifies multiple complexity values (e.g., by using multiple sliders 160 and multiple thumbs 170)—namely, one complexity value for each of the simultaneously-displayed stack traces.

Figure 6:
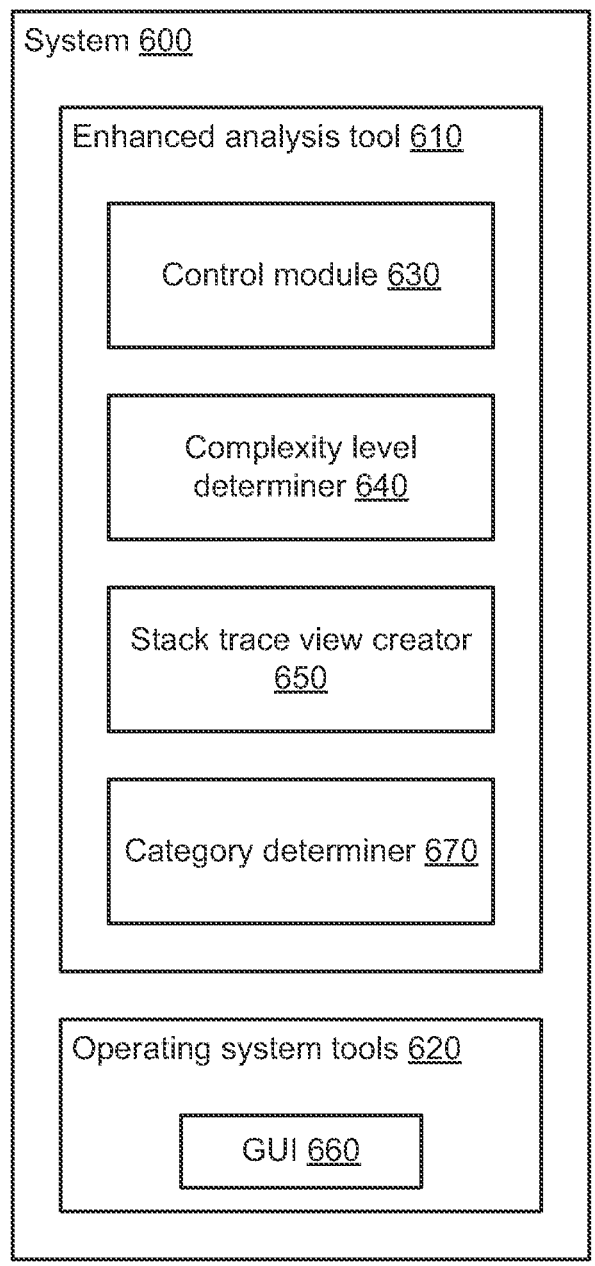
FIG. 6 is a block diagram of a system with an enhanced analysis tool for showing a stack trace with various views, according to one embodiment of the invention.

FIG. 6 is a block diagram of a system with an enhanced analysis tool for showing a stack trace with various views, according to one embodiment of the invention. The system 600 is able to show a stack trace with various views. The illustrated system 600 includes an enhanced analysis tool 610 and operating system tools 620.

In one embodiment, the enhanced analysis tool 610 (and its component modules) and the operating system tools 620 are one or more computer program modules stored on one or more computer readable storage mediums and executing on one or more processors. Additionally, the enhanced analysis tool 610 (and its component modules) and the operating system tools 620 are communicatively coupled to one another to at least the extent that data can be passed between them. In one embodiment, the operating system tools 620 are executing as one or more parts of an operating system on a personal computer, and the enhanced analysis tool 610 is executing on the same personal computer.

The operating system tools 620 include a graphical user interface (GUI) 660. The GUI 660 outputs information to a use (e.g., using a display device) and receives information from a user (e.g., using a pointing device and/or keyboard).

The enhanced analysis tool 610 includes several modules, including control module 630, complexity level determiner 640, stack trace view creator 650, and category determiner 670. Modules can be built in to the analysis tool or can be loaded in to the analysis tool separately (e.g., from a software development kit or "SDK").

The control module 630 shows a stack trace with various views. Its operation is discussed below with reference to FIG. 7.

The complexity level determiner 640 determines a complexity level based on received user input. For example, a user moves a thumb 170 of a slider 160 or turns a dial in the GUI. The new position of the thumb 170 or dial is received by the complexity level determiner 640 (e.g., from GUI 660). The complexity level determiner 640 maps the new position to a complexity level.

The mapping is performed based on the new position and the defined complexity levels. A new position that is at the minimum value of the GUI control is mapped to the lowest complexity level (e.g., most simplified). A new position that is at the maximum value of the GUI control is mapped to the highest complexity level (e.g., not simplified at all). A new position that is between the minimum value and the maximum value of the GUI control is mapped to an appropriate complexity level. Which complexity level is appropriate depends on how many complexity levels have been defined and what the value of the GUI control is (compared to the minimum value and maximum value).

The category determiner 670 determines a category for a particular library. For example, the category determiner 670 determines that a graphics library should be associated with the "Graphics" category. Recall that a category (or "library type") is associated with a category icon 130. A graphics library associated with the "Graphics" category is represented by a pie chart category icon. Specifically, when the analysis tool GUI shows a stack frame entry 110, the category icon 130 that is shown for that entry is associated with the category (library type) of the library that defined the function call that created the stack frame. Note that the concept of a category can be maintained internally (e.g., to use in conjunction with simplification heuristics) without needing to display a category icon 130 to the user.

In one embodiment, the category determiner 670 determines a category based on metadata associated with a library (e.g., debug information). Recall that the "User" category is used for a library that has debug information and/or source files available (such as a user file). In one embodiment, debug information (a type of library metadata) includes data on what source file contains a given function name of a stack frame. If the analysis tool (e.g., the category determiner 670) can find the source file on disk, then the User category is used for that library.

In one embodiment, the category determiner 670 determines a category based on the name of a library (e.g., by applying regular expressions to the library name). Appendix A includes regular expressions for categorizing library names, according to one embodiment of the invention. Other embodiments can use more or fewer regular expressions and/or different regular expressions. Appendix A forms part of this disclosure.

The stack trace view creator 650 creates a view of a given stack trace based on a complexity level. In one embodiment, a defined complexity level is associated with a set of heuristics that is used to create a view of a stack trace.

An example of stack trace views is now presented. For this example, assume that 6 complexity levels have been defined, from level 0 (the most complex to level 5 (the least complex). Level 0 corresponds to a complete stack trace (i.e., a stack trace that has not been simplified in any way). Level 5 corresponds to the most simplified view of a stack trace. The following stack trace is given, where each line of text represents one stack frame (library categories are also provided below for explanatory purposes, although they are not part of the stack trace):

| | |
|---|---|
| finalframe 0 | User |
| finalframe 1 | User |
| finalframe 2 | User |
| finalframe 3 | User |
| finalframe N | User |
| entry frame in AppKit (frame 0) | Cocoa |
| AppKit frame 1 | Cocoa |
| AppKit frame 2 | Cocoa |
| AppKit frame 3 | Cocoa |
| exit frame from AppKit (frame 4) | Cocoa |
| entry frame in Foundation (frame 0) | Frameworks |
| Foundation frame 1 | Frameworks |
| Foundation frame 2 | Frameworks |
| Foundation frame 3 | Frameworks |
| exit frame from Foundation (frame M) | Frameworks |
| entry frame in CoreFoundation (frame 0) | System |
| CoreFoundation frame 1 | System |
| CoreFoundation frame 2 | System |
| CoreFoundation frame 3 | System |
| CoreFoundation frame 4 | System |
| exit frame from CoreFoundation (frame 5) | System |
| entry frame in LibSystem (frame 0) | System |
| LibSystem frame 1 | System |
| LibSystem frame 2 | System |
| LibSystem frame 3 | System |
| exit frame from LibSystem (frame 4) | System |
| main | User |

Each complexity level is now discussed, including the heuristics associated with that complexity level (if any). The heuristics are used to generate the appropriate view of the stack trace. In this example, the stack trace view for a particular complexity level is created by applying heuristics for the previous complexity level(s) in addition to applying heuristics for that particular complexity level. In other words, the stack trace view for complexity level 1 is created by applying heuristics for complexity level 0 in addition to applying heuristics for complexity level 1. The stack trace view for complexity level 2 is created by applying heuristics for complexity levels 0 and 1 in addition to applying heuristics for complexity level 2. And so on.

As discussed above, complexity level 0 corresponds to a complete stack trace (i.e., a stack trace that has not been simplified in any way). Since no simplification is performed at level 0, there are no associated heuristics. The view of the stack trace given above at complexity level 0 is identical to the stack trace itself and will not be reproduced here.

Complexity level 1 in one embodiment is associated with the following heuristics: Hide entries for frames (function calls) between entry and exit for each library not in the User category. (Not hiding entries for entry frames and exit frames, while hiding entries for frames between entry and exit, decreases the complexity of the stack trace while still maintaining context for each library.) The view of the stack trace given above at complexity level 1 is as follows, where "- - -" represents dotted line 310, 410, or 510:

| | |
|---|---|
| finalframe 0 | User |
| finalframe 1 | User |
| finalframe 2 | User |
| finalframe 3 | User |
| finalframe N | User |
| entry frame in AppKit (frame 0) | Cocoa |
| - - - | |
| exit frame from AppKit (frame 4) | Cocoa |
| entry frame in Foundation (frame 0) | Frameworks |
| - - - | |
| exit frame from Foundation (frame M) | Frameworks |
| entry frame in CoreFoundation (frame 0) | System |
| - - - | |
| exit frame from CoreFoundation (frame 5) | System |
| entry frame in LibSystem (frame 0) | System |
| - - - | |
| exit frame from Lib System (frame 4) | System |
| main | User |

Complexity level 2 is associated with the following heuristics: Hide entries for frames (function calls) between entry and exit for any library not in the User category (including across boundaries that divide one non-User library from another non-User library). The view of the stack trace given above at complexity level 2 is as follows, where "- - -" represents dotted line 310, 410, or 510:

| | |
|---|---|
| finalframe 0 | User |
| finalframe 1 | User |
| finalframe 2 | User |
| finalframe 3 | User |
| finalframe N | User |
| entry frame in AppKit (frame 0) | Cocoa |
| - - - | |
| exit frame from LibSystem (frame 4) | System |
| main | User |

Complexity level 3 is associated with the following heuristics: Hide entries for frames (function calls) for all libraries, except those libraries that have debug information. (Libraries that a user is actively analyzing are typically built with full debug information so that an analysis tool can better understand the code as it executes. This debug information is typically added with a debug flag passed to a compiler, such as the "-gdwarf-2" flag passed to the GCC-4.2 compiler.) The view of the stack trace given above at complexity level 3 is as follows, where "- - -" represents dotted line 310, 410, or 510:

| | |
|---|---|
| finalframe 0 | User |
| finalframe 1 | User |
| finalframe 2 | User |
| finalframe 3 | User |
| finalframe N | User |
| - - - | |
| main | User |

Complexity level 4 is associated with the following heuristics: Hide entries for frames (function calls) that are in the middle of the stack trace (i.e., hide all entries except the first entry and the last entry). The view of the stack trace given above at complexity level 4 is as follows, where "- - -" represents dotted line 310, 410, or 510:

| finalframe 0 | User |
|---|---|
| --- | |
| main | User |

Complexity level 5 is associated with the following heuristics: Show the entry for only the innermost frame (i.e., hide all entries except the first entry). The view of the stack trace given above at complexity level 5 is as follows, where "- - -" represents dotted line 310, 410, or 510:

| finalframe 0 | User |
|---|---|

In one embodiment, FIG. 1 corresponds to a view of a stack trace at level 0; FIG. 3 corresponds to a view of the same stack trace at level 1; FIG. 4 corresponds to a view of the same stack trace at level 3; and FIG. 5 corresponds to a view of the same stack trace at level 5.

Figure 12:
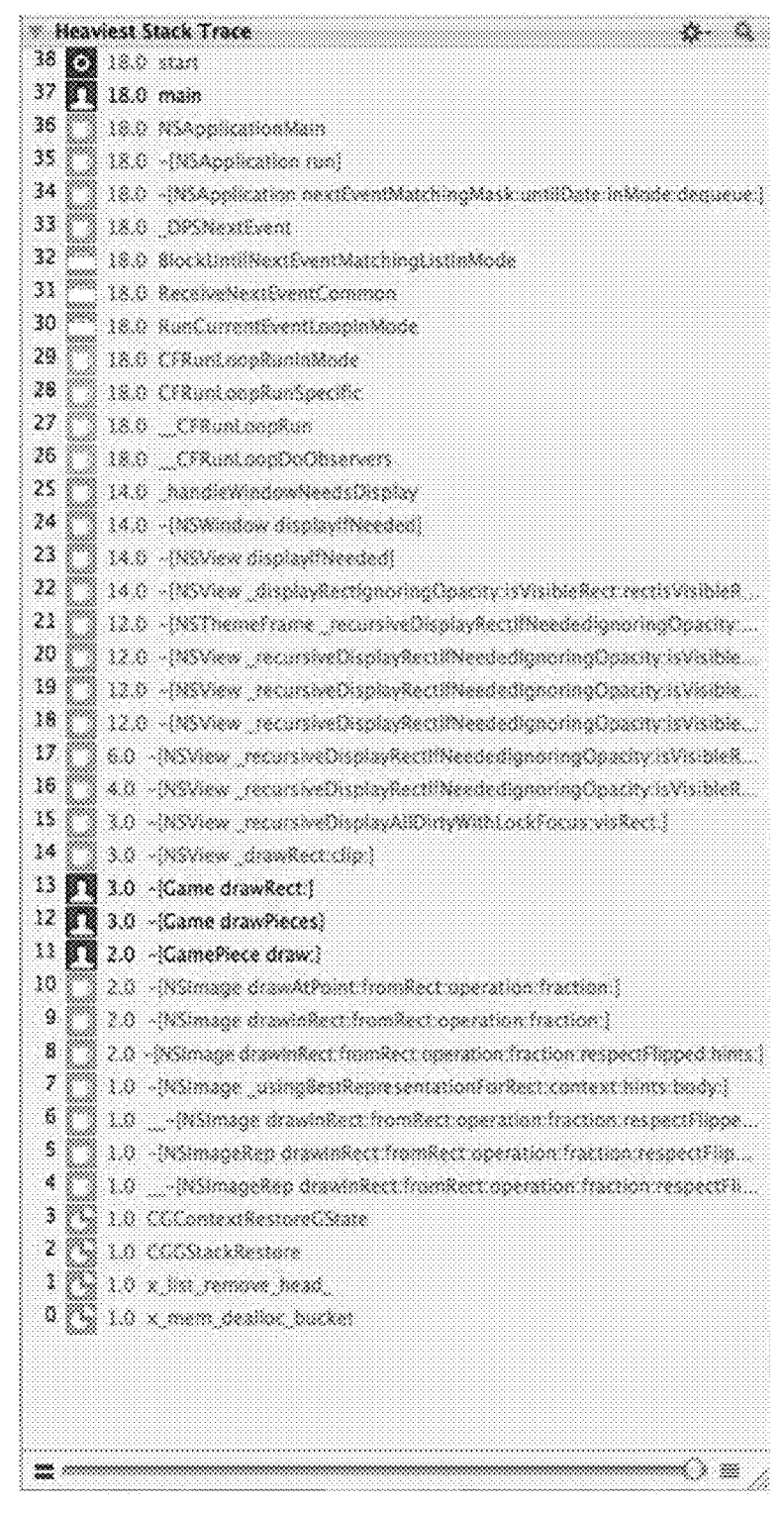
Figure 14:
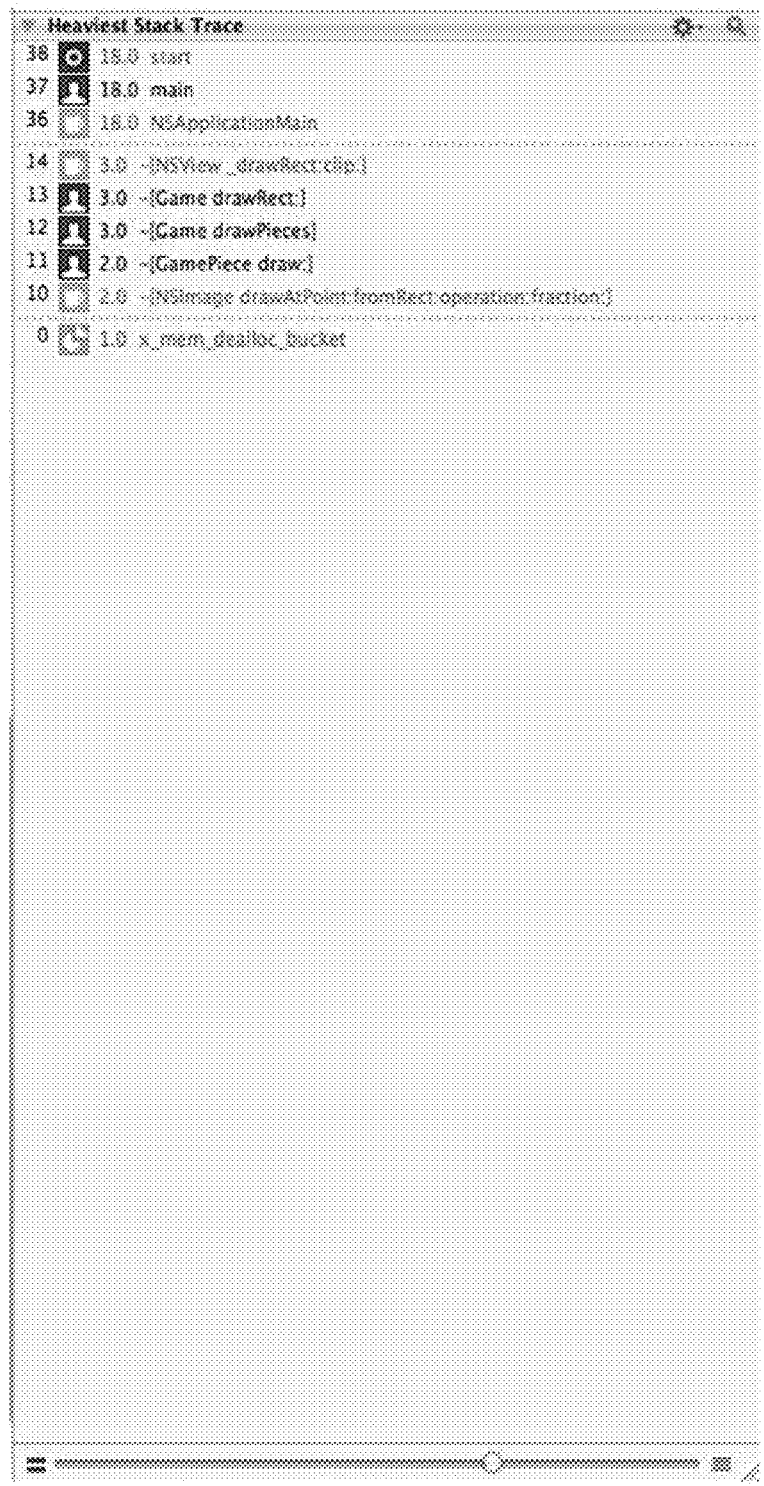
FIG. 14 illustrates a GUI for an analysis tool that includes a moderately simplified view of the stack trace illustrated in FIG. 12, according to another embodiment of the invention.
Figure 15:
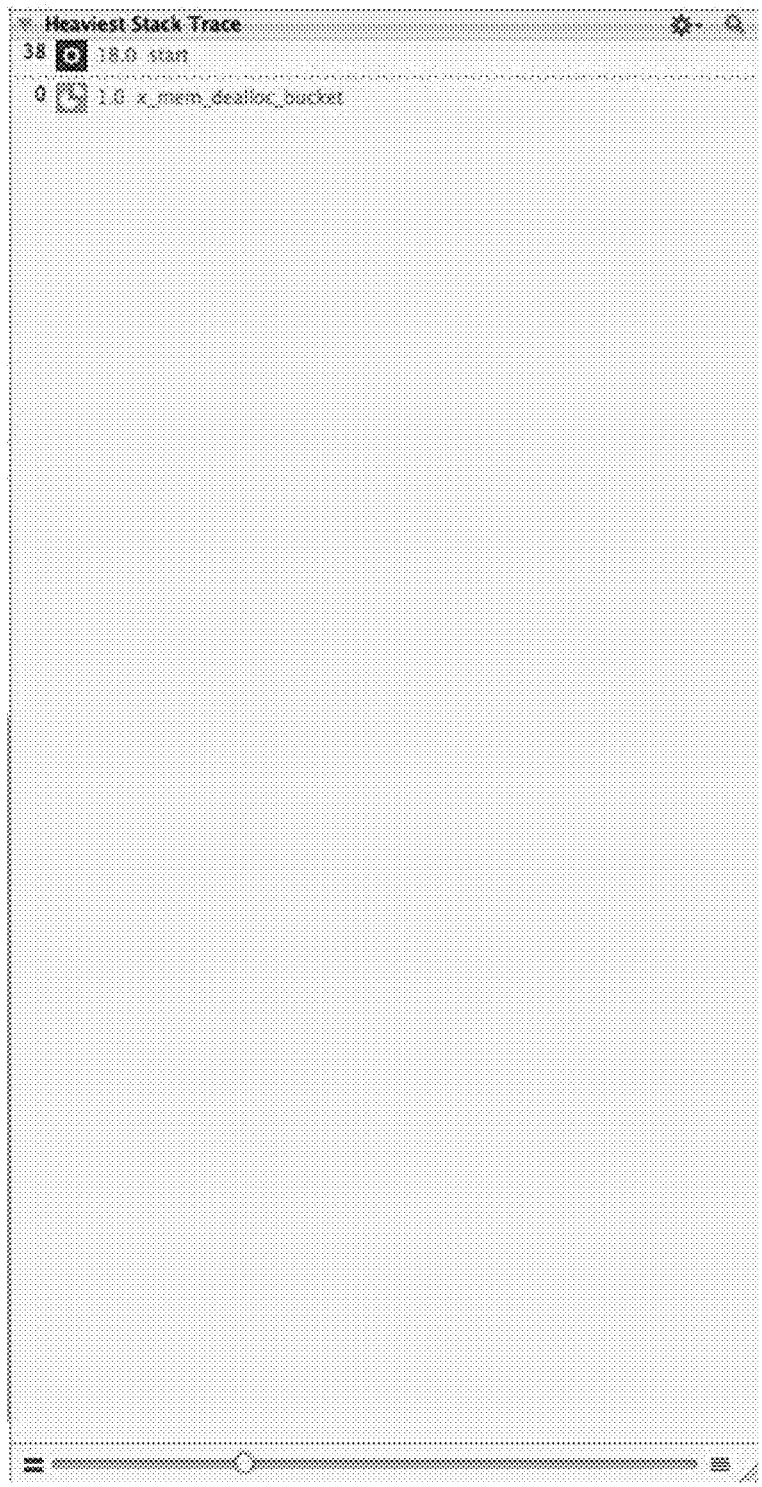
FIG. 15 illustrates a GUI for an analysis tool that includes a heavily simplified view of the stack trace illustrated in FIG. 12, according to another embodiment of the invention.

FIG. 12 illustrates a GUI for an analysis tool that includes a complete stack trace, according to another embodiment of the invention. In one embodiment, FIG. 12 corresponds to a view of a stack trace at level 0. FIG. 13 illustrates a GUI for an analysis tool that includes a lightly simplified view of the stack trace illustrated in FIG. 12, according to another embodiment of the invention. In one embodiment, FIG. 13 corresponds to a view of the same stack trace at level 1. FIG. 14 illustrates a GUI for an analysis tool that includes a moderately simplified view of the stack trace illustrated in FIG. 12, according to another embodiment of the invention. In one embodiment, FIG. 14 corresponds to a view of the same stack trace at level 3. FIG. 15 illustrates a GUI for an analysis tool that includes a heavily simplified view of the stack trace illustrated in FIG. 12, according to another embodiment of the invention. In one embodiment. FIG. 15 corresponds to a view of the same stack trace at level 5. In the embodiments of FIGS. 12-15, the stack frames have varying weights. Also, the innermost frame has a frame number of 0, and the outermost frame has a frame number of 38.

Figure 7:
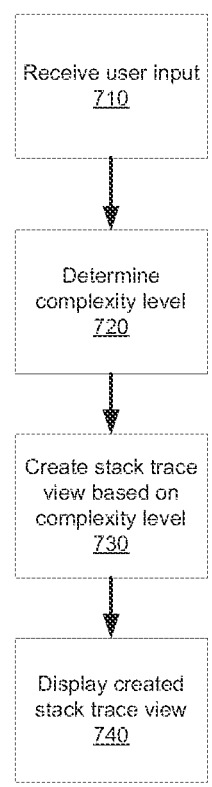
FIG. 7 is a flowchart of a method for showing a stack trace with various views, according to one embodiment of the invention.

FIG. 7 is a flowchart of a method for showing a stack trace with various views, according to one embodiment of the invention. In one embodiment, steps 710 to 740 are performed by various modules within the enhanced analysis tool 610. In step 710, user input is received. For example, a user moves a thumb 170 of a slider 160 or turns a dial. The GUI 660 processes the user input and provides the new position of the thumb 170 or dial to the control module 630. The control module 630 receives 710 the user input (e.g., the new position).

In step 720, a complexity level is determined. For example, the control module 630 provides the user input position to the complexity level determiner 640. The complexity level determiner 640 determines a complexity level based on the received user input position. The complexity level determiner 640 provides the determined complexity level to the control module 630.

In step 730, a stack trace view is created based on the determined complexity level. For example, the control module 630 provides the determined complexity level to the stack trace view creator 650. The stack trace view creator 650 accesses the relevant stack trace and creates a view of the stack trace according to the determined complexity level (e.g., using heuristics associated with that complexity level). If necessary, the stack trace view creator 650 uses the category determiner 670 to categorize libraries (e.g., in order to apply heuristics). The stack trace view creator 650 provides the created stack trace view to the control module 630.

In step 740, the created stack trace view is displayed. For example, the control module 630 provides the created stack trace view to the GUI 660. The GUI displays 740 the created stack trace view.

If additional user input is received, the method in FIG. 7 is repeated (not shown).

Reference in the specification to "one embodiment" or to "an embodiment" means that a particular feature, structure, or characteristic described in connection with the embodiments is included in at least one embodiment of the invention. The appearances of the phrase "in ine embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to the specification may include a single processor or may be architectures employing multiple processor designs for increased computing capability.

The methods and displays presented herein are not inherently related to any particular computer or other apparatus. —Various general-purpose systems may also be used with programs in accordance with the teachings herein, or it may prove convenient to construct more specialized apparatus to perform the required method steps. The required structure for a variety of these systems will appear from the above description. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

APPENDIX A (REGULAR EXPRESSIONS FOR CATEGORIZING LIBRARY NAMES)

a) Audio, Speech
"/(Speech[^/]*\\.framework|[^/]*(A|a)udio[^/]*\\.(framework|component|bundle|kext)|AppleHDA.kext)/"
b) Cocoa (API)
"/AppKit\\.framework/"
c) Database
"/CoreData\\.framework/|/libsql[^/]*\\.dylib"
d) Frameworks
"/System/Library/(Private)?Frameworks/[^/]*\\.framework/"
e) Graphics
"/(Core(Text|UI|Graphics|Video|Media(IOServices)?|PDF)|ATS|ColorSync|ImageIO|OpenGL|Quartz(Core)?|QTKit|VideoToolbox|OpenCL|QD|IOSurface)\\.framework/"
f) Languages
"/(JavaVM|Ruby|Python|Tcl|Tk)\\.framework/|/ruby/|/lib(tcl|tk|python|perl)[^/]*\\.dylib"
g) Network I/O
"/(CFNetwork|IO)\\.framework/"
h) Security
"/(Security(Foundation|Interface|HI)?|Kerberos(Helper)?|TrustEvaluationAgent)\\.framework/|/lib(crypto|ssl|sasl2)[^/]*\\.dylib|/sasl2/"
i) System
"/usr/lib/(((system/)?lib[^/]*\\.dylib)|dyld)"
j) Web
"/(Web(Kit|Core)|JavaScriptCore)\\.framework/"

What is claimed is:

1. A computer-implemented method for generating a view of a stack trace, the method comprising:
 receiving a selected complexity level at which to generate the view of the stack trace, wherein the stack trace includes multiple stack frames;
 generating the view of the stack trace for the selected complexity level by:
  applying a set of heuristics associated with the selected complexity level to the stack trace to modify the view of the stack trace, and
  when the set of heuristics includes a limitation to hide one or more entries associated with a specific library:
   hiding, from the view of the stack trace, a user interface (UI) entry that corresponds to one of the multiple stack frames;
   generating a visual indication of the hidden UI entry between a first stack frame number and second stack frame number, and between image-based icons representing one or more libraries associated with stack frame entries, wherein a difference between the first stack frame number and the second stack frame number indicates that the UI entry is hidden; and
  displaying, at a display device, the generated view of the stack trace.

2. The computer-implemented method of claim 1, wherein the selected complexity level corresponds to a user input, and the user input is a manipulation of a graphical user interface (GUI) control element.

3. The computer-implemented method of claim 2, wherein the GUI control element is a slider or a dial, and the difference between the first stack frame number and the second stack frame number changes according to the manipulation of the GUI control element.

4. The computer-implemented method of claim 2, wherein the GUI control element is a slider displayed concurrently with the visual indication of the hidden UI entry.

5. The computer-implemented method of claim 1, wherein the visual indication is a line extending above or below the hidden UI entry.

6. The computer-implemented method of claim 1, wherein the view of the stack trace includes UI entries that correspond to stack frames included in the stack trace, and a displayed UI entry provides information associated with a corresponding stack frame.

7. The computer-implemented method of claim 6, wherein at least one of the stack frames is associated with a particular function, and the displayed UI entry corresponds to at least one of:
 a category of a library associated with the particular function; and a weight that indicates how much time was spent executing the particular function.

8. The computer-implemented method of claim 1, wherein the visual indication of the hidden UI entry is located between an enter stack frame for a library and an exit stack frame for the library.

9. The computer-implemented method of claim 1, wherein the set of heuristics includes hiding UI entries for all stack frames included in the stack trace, except UI entries for stack frames that are associated with libraries that have debug information.

10. A non-transitory computer-readable storage medium configured to store instructions that, when executed by a processor in a computing device, cause the computing device to perform the steps of:
   receiving a selected complexity level at which to generate a view of a stack trace, wherein the stack trace includes multiple stack frames;
   generating the view of the stack trace
      for the selected complexity level by:
         applying a set of heuristics associated with the selected complexity level to the stack trace to modify the view of the stack trace, and
         when the set of heuristics includes a limitation to hide one or more entries associated with a specific library:
            hiding, from the view of the stack trace, a user interface (UI) entry that corresponds to one of the multiple stack frames;
            generating a visual indication of the hidden UI entry between a first stack frame number and a second stack frame number, wherein a difference between the first stack frame number and the second stack frame number indicates the UI entry is hidden; and
      displaying, at a display device, the generated view of the stack trace.

11. A system for generating a view of a stack trace, comprising:
   a processor; and
   a memory storing instructions that when executed by the processor cause the system to perform the steps of:
      receiving a selected complexity level at which to generate the view of the stack trace, wherein the stack trace includes multiple stack frames;
      applying a set of heuristics associated with the selected complexity level to the stack trace to modify the view of the stack trace; and
      when the selected complexity level includes a hidden user interface (UI) entry corresponding to a stack frame entry between multiple stack frame entries:
         hiding, from the view of the stack trace, a user interface entry that corresponds to one of the multiple stack frames;
         generating a visual indication of the hidden UI entry between a first stack frame number and a second stack frame number, wherein a difference between the first stack frame number and the second stack frame number indicates the UI entry is hidden; and
   a display module adapted to cause a display device of the system to display the generated view of the stack trace.

12. The non-transitory computer-readable storage medium of claim 10, wherein hiding the UI entry includes not displaying the UI entry that corresponds to one of the multiple stack frames.

13. The system of claim 11, wherein the steps further include:
   causing the visual indication of the hidden UI entry to be displayed, and excluding, from being displayed, a specific category icon associated with a specific library.

14. The non-transitory computer-readable storage medium of claim 10, wherein a displayed UI entry provides information associated with a corresponding stack frame.

15. The non-transitory computer-readable storage medium of claim 14, wherein at least one of the multiple stack frames is associated with a particular function, and the displayed UI entry corresponds to at least one of:
   a category of a library associated with the particular function; and
   a weight that indicates how much time was spent executing the particular function.

16. The non-transitory computer-readable storage medium of claim 10, wherein the visual indication of the hidden UI entry is located between an enter stack frame for a library and an exit stack frame for the library.

17. The non-transitory computer-readable storage medium of claim 10, wherein the difference between the first stack frame number and the second stack frame number changes based on a manipulation of a GUI control element.

18. The system of claim 11, wherein the difference between the first stack frame number and the second stack frame number changes based on a manipulation of a GUI control element.

19. The system of claim 11, wherein a displayed UI entry provides information associated with a corresponding stack frame.

20. The system of claim 19, wherein at least one of the multiple stack frames is associated with a particular function, and the displayed UI entry corresponds to one of:
   a category of a library associated with the particular function; and
   a weight that indicates how much time was spent executing the particular function.

* * * * *